US012778017B2

(12) United States Patent
Somarowthu et al.

(10) Patent No.: US 12,778,017 B2
(45) Date of Patent: Nov. 3, 2026

(54) SYSTEM AND METHOD TO CONTROL PLUGGING OF A WINDROWER

(71) Applicant: Deere & Company, Moline, IL (US)

(72) Inventors: Mahesh Somarowthu, Pune (IN); Mahi Agrawal, Pune (IN); Kewal K. Ukunde, Satak (IN)

(73) Assignee: Deere & Company, Moline, IL (US)

(*) Notice: Subject to any disclaimer, the term of this patent is extended or adjusted under 35 U.S.C. 154(b) by 477 days.

(21) Appl. No.: 18/503,578

(22) Filed: Nov. 7, 2023

(65) Prior Publication Data

US 2025/0143216 A1 May 8, 2025

(51) Int. Cl.
*A01D 61/00* (2006.01)
*A01D 43/10* (2006.01)
*A01D 57/30* (2006.01)

(52) U.S. Cl.
CPC ......... *A01D 61/004* (2013.01); *A01D 43/105* (2013.01); *A01D 57/30* (2013.01)

(58) Field of Classification Search
CPC .... A01D 61/004; A01D 43/105; A01D 57/30; A01D 75/182; A01D 43/10
See application file for complete search history.

(56) References Cited

U.S. PATENT DOCUMENTS 10,813,287 B2 10/2020 Rotole et al.
2018/0199508 A1* 7/2018 Mueller ............... A01D 43/077
2018/0325029 A1* 11/2018 Rotole ................... A01D 57/26
2019/0029182 A1* 1/2019 Glade ..................... F15B 1/033
2020/0367434 A1* 11/2020 Nakabayashi ....... A01B 69/008
2021/0007277 A1* 1/2021 Anderson ............ A01B 69/008
2021/0360857 A1* 11/2021 Steidinger .............. A01D 82/02
2023/0345878 A1* 11/2023 Hamilton ............... A01D 57/26

FOREIGN PATENT DOCUMENTS

| | | | |
|---|---|---|---|
| EP | 2735223 | A1 | 5/2014 |
| EP | 3114919 | A1 | 1/2017 |
| EP | 4066618 | A1 | 10/2022 |
| EP | 4111846 | A1 | 1/2023 |

OTHER PUBLICATIONS

Extended European Search Report and Written Opinion issued in European Patent Application No. 24210457.8 dated Mar. 14, 2025, in 09 pages.

* cited by examiner

*Primary Examiner* — Nhi Q Bui
(74) *Attorney, Agent, or Firm* — Tucker Ellis LLP

(57) ABSTRACT

An auger slip can be monitored to determine when an auger slip condition indicative of possible plugging of a harvesting work vehicle is present. In response to the auger slip condition, various implements of the harvesting work vehicle can be adjusted to resolve the auger slip condition or mitigate plugging. The implements may include a cutter bar, an auger, a roll gap, a swath flap, and/or a shield former. Further, an engine speed or vehicle speed of the harvesting work vehicle can be adjusted to mitigate plugging.

20 Claims, 7 Drawing Sheets

SYSTEM AND METHOD TO CONTROL PLUGGING OF A WINDROWER

BACKGROUND

In an agricultural setting, crop materials are often cut, conditioned, arranged into windrows, and/or otherwise processed. In some cases, the crop materials may be raked, chopped, and/or baled as well. Certain work vehicles are provided for these activities. Some harvesting work vehicles and attachable equipment, such as conditioning work vehicles and/or windrowing work vehicles, may include implements for cutting, conditioning, and/or arranging the crop material into a windrow as the work vehicle moves across a field.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a system for adjusting an agricultural machine is provided. The system includes a controller that receives input data indicative of auger slip. The controller includes at least one processor and a memory that stores instructions. The instructions, when executed by the at least one processor, configure the at least one processor to: generate auger slip data indicative of an auger slip condition based on the input data; and generate adjustment data indicative of an adjustment to one or more components of the agricultural machine to mitigate the auger slip condition of the agricultural machine. The system also includes one or more actuators that adjust the one or more components of the agricultural machine based at least on the adjustment data.

In another implementation, a method for controlling plugging of a windrower is provided. The method includes acquiring a ratio between a cutter bar speed and an auger speed. The method also includes evaluating the ratio to determine an auger slip condition. The method further includes, when the auger slip condition is determined, independently controlling the cutter bar speed and the auger speed through adjustment to respective actuators to mitigate the auger slip condition.

In yet another implementation, a system for a windrower is provided. The system includes a set of sensors configured to sense at least a speed of a cutter bar and a speed of an auger. The system also includes a header with a header actuator. The system also includes the auger with an auger actuator. In addition, the system includes a controller. The controller is configured to receive sensor data from the set of sensors. The controller is further configured to determine an auger slip condition based the speed of the cutter bar and the speed of the auger. In addition, the controller is configured to generate adjustment data indicative of an adjustment to at least one of the header or the auger. The controller is also configured to generate one or more control signals based on the adjustment data. The controller is also configured to communicate the one or more control signals to at least one of the header actuator or the auger actuator. In addition, the header actuator and the auger actuator are decoupled and independently controllable by the controller.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

Figure 1:
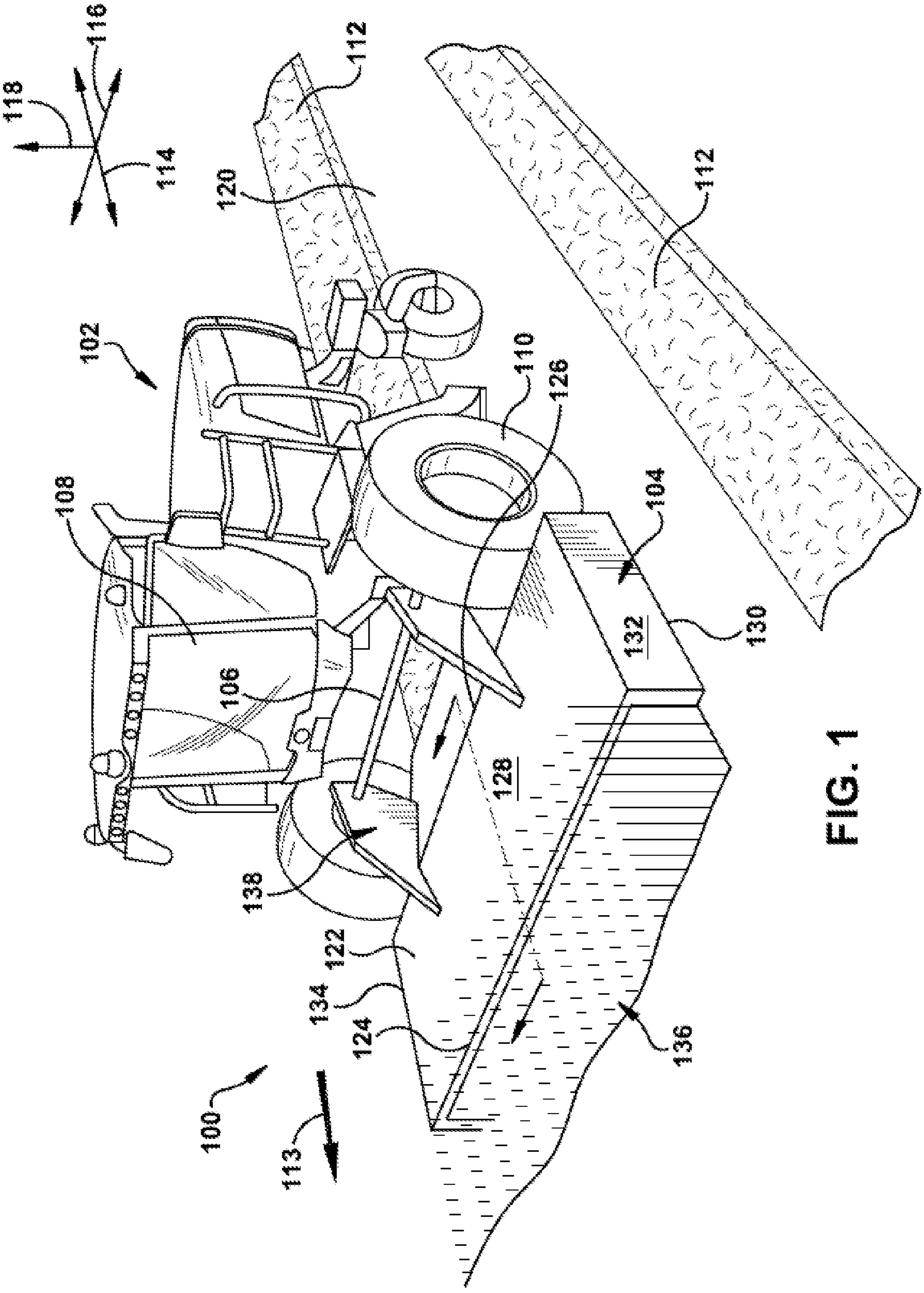
FIG. 1 illustrates a diagram of an exemplary, non-limiting implementation of a vehicle according to various aspects.

As described above, some crops may be harvested by cutting the crop and forming windrows with an agricultural machine such as a self-propelled windrower or a mower-conditioner. Such machines may have a header with a cutter bar that operates to cut the crop. The machines may also have a conveyor such as an auger to carry cut crop material from the cutter bar to other components. Plugging can lead to significant costs as crop material is manually removed from the machine before harvesting can continue. While incoming crop may be monitored to predict plugging of the windrower, conventional machines do not provide closed loop control to avoid plugging.

According to an aspect, the cutter bar and the auger may be tightly coupled. A ratio between a cutter bar speed and an auger speed may be maintained with a mechanical gear assembly. For example, in some implementations, a header knife drive system may rotate roughly 2.65 times as fast as auger system. Plugging may be indicated by an auger slip condition, which may be shown by a change in the ratio for some duration (e.g. 5 seconds, etc.). For instance, in the example above, a moderate slip may be determined when a ratio is greater than or equal to 2.70 for more than 5 seconds or less than or equal to 2.60 for more than 5 seconds. Similarly, an extreme slip may be determined when the ratio is greater than or equal to 2.75 for more than 2 seconds or less than or equal to 2.55 for more than 2 seconds. It is to be appreciated that a threshold amount of deviation from a ratio setpoint and a duration of deviation utilized to determine slip conditions may be vary based on a structure of the machine and/or may be configurable for different environments. The above definition is merely exemplary and is not limiting.

According to an aspect, an auger slip value can be monitored. When an auger slip condition is determined, an alert can be output to an operator via an operator interface.

In another example, automated control of the machine may be employed. For instance, header load, engine speed, and the ratio are monitored. In the case of slip, header speed may be increased. This may also increase the auger speed. In another aspect, the engine speed may be increased. This may also increase the header speed by, for example, changing a setpoint. In yet another control scenario, a vehicle speed may be decreased. In addition, a roll gap may be increased and/or a forming shield and swatch flap may be controlled. Any of the foregoing machine controls may be employed to avoid and/or clear plugging of the windrower indicated by the auger slip condition.

In another aspect, further control scenarios may be available through separate hardware assemblies, which can lead to fuel savings based on an incoming mass of crop material. For example, separate pump drive motors can be provisioned for the header and the roll gap or auger. Alternatively, these components may be decoupled via a clutch or gear assembly. With this structure, the motors or components can be independently controlled. For example, an auger speed may be increased and/or a header speed may be decreased. In another aspect, conditioner speed may be independently controlled to improve conditioning of crop material. A drop distance of crop material may also be adjusted through control of the conditioner speed. In some instances, the conditioner speed may be adjusted together with another component to minimize crop loss. Still further, in the case of extreme slip conditions (i.e. plugging), the header and/or auger may be reversed. Through decoupling of the header and auger, for example, windrowing operations become more efficient and faster. Further, crop quality can be improved and, thus, productivity.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, an exemplary, non-limiting implementation of a work vehicle 100 is illustrated. In the example shown in FIG. 1, vehicle 100 may be a harvesting work vehicle, such as a windrower 100. In some embodiments, the windrower 100 may be a self-propelled machine. However, the systems and methods described herein may be equally applicable to towed machines, or other configurations, as will be appreciated by those having skill in the art. Furthermore, although harvesting work vehicles that mow, condition and windrow crop materials are sometimes interchangeably referred to as mower-conditioners, windrowers, or forage harvester, for the sake of simplicity, such machines will be referred to herein as "windrowers". Further, one or more portions of the methods and systems described herein may apply to other harvesting work vehicles or to construction and forest harvester vehicles.

Machines that collect and condition crop material, and form a windrow from the same material are discussed according to implementations of the present disclosure; however, it will be appreciated that the present teachings may apply to machines that form windrows without necessarily conditioning the crop material. The present teachings may also apply to machines that condition (crimp, crush, etc.) crop material without necessarily forming a windrow.

Furthermore, the systems and methods of the present disclosure may apply to harvesting of various types of crop materials, such as grasses, alfalfa, silage, or otherwise. Accordingly, it will be appreciated that a wide variety of machines, systems, and methods may fall within the scope of the present disclosure.

In some embodiments, the windrower 100 broadly comprises a self-propelled tractor 102 and a header 104 (i.e., header attachment). The header 104 may be attached to the front of the tractor 102. The tractor 102 may include a chassis 106 and an operator compartment 108 supported atop the chassis 106. The operator compartment 108 may provide an enclosure for an operator and for mounting various user control devices (e.g., a steering wheel, accelerator and brake pedals, etc.), communication equipment and other instruments used in the operation of the windrower 100, including a user interface providing visual (or other) user control devices and feedback. The tractor 102 may also include one or more wheels 110 or other traction elements for propelling the tractor 102 and the header 104 across a field or other terrain. The windrower 100 may form a windrow 112 as it moves along a travel direction indicated by the arrow 113.

The windrower 100 may define a coordinate system, such as a Cartesian coordinate system having a longitudinal axis 114, a lateral axis 116, and a vertical axis 118. The longitudinal axis 114 may be substantially parallel to the travel direction 113. The\ lateral axis 116 may be horizontal and normal to the longitudinal axis 114 to extend between opposing sides of the windrower 100. The vertical axis 118 may extend vertically and normal to the longitudinal axis 114, the lateral axis 116, and the ground 120.

The header 104 may generally include a frame 122, which is mounted to the chassis 106. The frame 122 may be mounted for movement relative to the chassis 106. For example, the frame 122 may move up and down, at least partly, along the vertical axis 118 relative to the chassis 106 and relative to crop material 136. In some embodiments, the frame 122 may tilt and rotate about an axis that is parallel to the lateral axis 116. Also, the frame 122 may comprise one or more support elements for supporting the implements (i.e., arrangement of implements, etc.) described below.

The frame 122 may generally include a front end 124 and a rear end 126. The rear end 126 may be spaced apart along the longitudinal axis 114 and may be attached to the chassis 106 of the tractor 102. The frame 122 may also include a top structure 128 and a lower area 130, which are spaced apart along the vertical axis 118. Furthermore, the frame 122 may include a first lateral side 132 and a second lateral side 134, which are spaced apart along the lateral axis 116.

In the embodiment shown and discussed below, the front end 124 is open to receive crop material 136 as the tractor 102 moves across the field. In some embodiments, the windrower 100 cuts the crop material 136, then conditions the crop material, and then shapes, places and/or arranges the crop material 136 into the windrow 112 as the tractor 102 moves.

Figure 2:
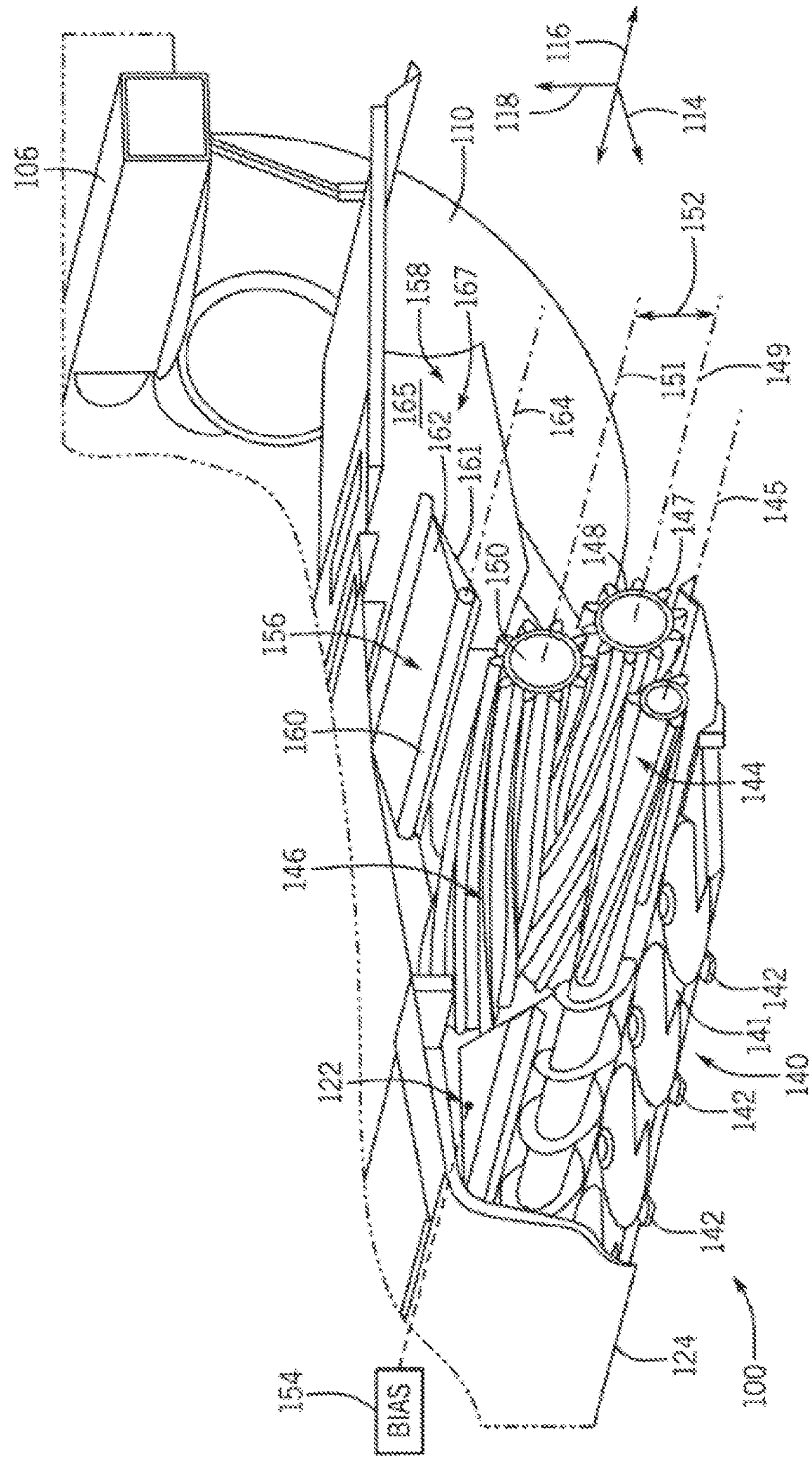
FIG. 2 illustrates a section view of the vehicle of FIG. 1 according to various aspects.
Figure 3:
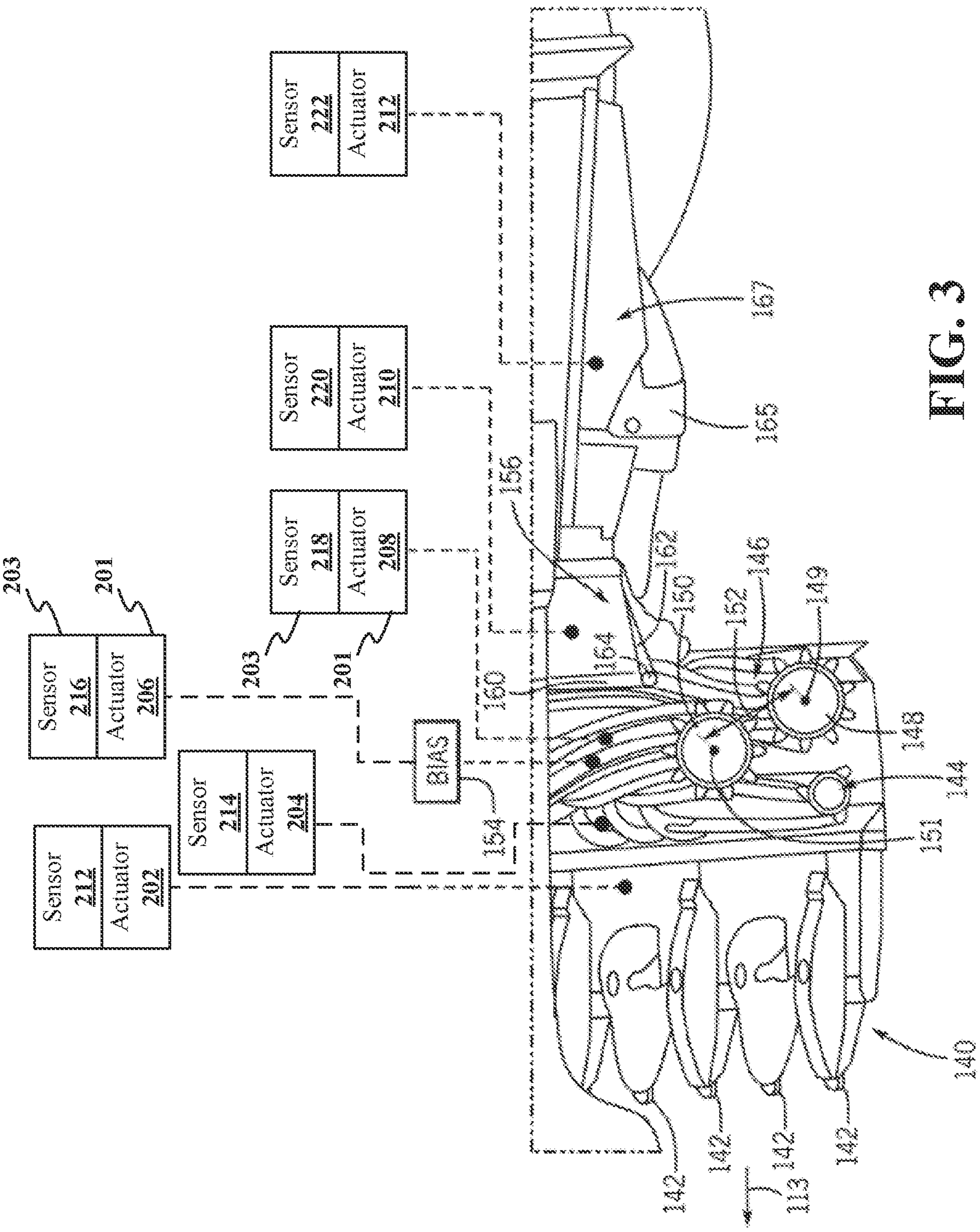
FIG. 3 illustrates a section view of the vehicle of FIG. 2 according to various aspects.

Referring now to FIGS. 2 and 3, the windrower 100 may include one or more arrangements (i.e., arrangements of various implements, tools, etc.), which may be supported by the frame 122 and/or supported by the chassis 106. For example, the windrower 100 may include a cutting arrangement 140 for severing standing crop material 136 as the windrower 100 moves through the field. In some embodiments, the cutting arrangement 140 may include one or more blades 142 that are supported by a support structure 141, proximate the front end 124 of the frame 122. The cutting arrangement 140 may include rotating blades as shown in FIGS. 2 and 3; however, the cutting arrangement 140 may include reciprocating sickle-like blades or other configurations without departing from the scope of this disclosure.

The windrower 100 may further include a conveyor arrangement 144. The conveyor arrangement 144 may be an auger-like roller that is mounted for rotation about an axis 145. The axis 145 may be substantially parallel to the lateral axis 116 of the windrower 100. A support structure for the conveyor arrangement 144 is not shown specifically, but may be disposed proximate the first lateral side 132 and the second lateral side 134 of the frame 122 (FIG. 1). Once the crop material 136 has been cut by the cutting arrangement 140, the conveyor arrangement 144 may convey the crop material 136 rearward (generally along the longitudinal axis 114), away from the cutting arrangement 140 for further processing. It will be appreciated that the windrower 100 may include a different type of conveyor arrangement 144 without departing from the scope of the present disclosure. For example, the conveyor arrangement 144 may comprise a conveyor belt (e.g., a draper) in some embodiments.

Furthermore, the windrower 100 may additionally include at least one conditioning arrangement 146 (i.e., crop-conditioning implement, tool, etc.). In some embodiments, the conditioning arrangement 146 may comprise a conditioner roller and a member that opposes the conditioner roller, and crop material that passes between the roller and the opposing member are crimped, crushed, or otherwise conditioned by the pressure of the roller on the opposing member. In some embodiments represented in the figures, the conditioning arrangement 146 includes a first conditioner roller 148 and a second conditioner roller 150. The first and second conditioner rollers 148, 150 may include projections 147 that project radially and that extend helically about the respective roller. As will be discussed, crop material 136 may pass between the first and second conditioner rollers 148, 150 and the projections 147 may crimp, crush, or otherwise condition the crop material 136 (e.g., the stems of the crop material 136) as it passes between the rollers 148, 150. This conditioning may promote even drying of the crop material 136 as will be appreciated by those having ordinary skill in the art.

The first conditioner roller 148 may be elongate and may extend laterally between the first side 132 and the second side 134 of the frame 122. The ends of the first conditioner roller 148 may be mounted to the frame 122 (i.e., the support structure), proximate the first side 132 and the second side 134. The first conditioner roller 148 may be mounted for rotation relative to the frame 122 about an axis 149 that is substantially parallel to the lateral axis 116. In some embodiments, the rotation axis 149 of the first conditioner roller 148 may be disposed in a substantially fixed position relative to the frame 122. Thus, the first conditioner roller 148 may be referred to as a “fixed” roller.

The second conditioner roller 150 may be substantially similar to the first conditioner roller 148. The second conditioner roller 150 may be mounted to the frame 122 at each lateral end and may rotate about an axis 151. The axis 151 may extend substantially along the lateral axis 116. The second conditioner roller 150 may be spaced apart at a distance from the first conditioner roller 148. In other words, a gap 152 may be defined between the first and second conditioner rollers 148, 150. In the illustrated embodiment, the gap 152 is indicated between the axis 149 of the first conditioner roller 148 and the axis 151 of the second conditioner roller 150. However, the gap 152 may be measured from an outer radial boundary of the first conditioner roller 148 and an opposing outer radial boundary of the second conditioner roller 150. It will be appreciated that the dimension of the gap 152 may affect conditioning of the crop material 136 that passes between the first and second conditioner rollers 148, 150.

In addition to rotation about the axis 151, the second conditioner roller 150 may be supported for movement (linear or angular) relative to the first conditioner roller 148 to vary the dimension of the gap 152. In some embodiments, the second conditioner roller 150 may move at least partially along the vertical axis 118 relative to the first conditioner roller 148.

In the illustrated embodiment of FIGS. 2 and 3, the first and second conditioner rollers 148, 150 are shown at a neutral position relative to each other. The second conditioner roller 150 may be supported to move away from this neutral position (to a displaced position) to thereby increase the gap 152. In some embodiments, the conditioning arrangement 146 may further include at least one biasing member 154 (shown schematically). The biasing member 154 may be of any suitable type, such as a mechanical spring, a hydraulic biasing member, etc. The biasing member 154 may be mounted to the frame 122 and to the first and/or second conditioner roller 148, 150. More specifically, in some embodiments, the biasing member 154 may be mounted to the frame 122 and the second conditioner roller 150 such that the biasing member 154 biases the second conditioner roller 150 relative to the frame 122. The biasing member 154 may bias the second conditioner roller 150 toward the neutral position. Biasing force provided by the biasing member 154 may be relatively high so as to maintain the gap 152 (i.e., maintain the first and second conditioner rollers 148, 150 at the neutral position) as the crop material 136 moves through the conditioning arrangement 146. However, a large slug of crop material 136, rocks, or other objects may force the second conditioner roller 150 away from the first conditioner roller 148 against the biasing force of the biasing member 154, thereby increasing the gap 152. Once the material has cleared from between the first and second conditioner rollers 148, 150, the biasing member 154 may bias the second conditioner roller 150 back toward the neutral position.

The windrower 100 may further include at least one windrowing arrangement (i.e., windrow-shaping implement, tool, etc.) that is configured to shape, arrange, or otherwise form a windrow of the crop material 136. For example, as shown in FIGS. 2 and 3, the windrower 100 may include a first windrowing arrangement 156 (e.g., swath flap arrangement) and a second windrowing arrangement 158 (e.g., forming shield arrangement). In some embodiments, the first windrowing arrangement 156 may comprise a so-called swath flap 162 (i.e., swath board). Also, in some embodiments, the second windrowing arrangement 158 may comprise so-called forming shields 167.

As illustrated, the first windrowing arrangement 156 may include a support structure 160, such as a transversely extending tube, that is attached to the frame 122 at both ends. The first windrowing arrangement 156 may also include a swath flap 162. The swath flap 162 may be an elongated member that extends substantially along the lateral axis 116. The first windrowing arrangement 156 may be mounted to the support structure 160 and may extend rearward therefrom. The swath flap 162 may include a substantially wide, flat, and smooth deflecting surface 161. The swath flap 162 may be supported for rotation about a transverse axis 164 of the support structure 160 to change an angle of the surface 161 with respect to the ground. In some examples, the swath flap 162 may rotate between a raised position and a lowered position to change the position of the deflecting surface 161 relative to the crop material 136 received from the conditioning arrangement 146.

The second windrow shaping implement 158 may include at least one forming shield 167. The forming shield 167 may be substantially wide, flat, and smooth and may include at least one deflecting surface 165. The deflecting surface 165 may include a leading end 170 and a trailing end 172. The second windrow shaping implement 158, may include a first shield 166 and a second shield 168, each with a respective deflecting surface 165. The first shield 166 may be mounted proximate the first side 132 of the frame 122, and the second shield 168 may be mounted proximate the second side 134 of the frame 122. The deflecting surfaces 165 of the first and second shields 166, 168 may face each other and may converge rearward for shaping the crop material 136 into the windrow 112. The leading end 170 of the shields 166, 168 may flare outwardly to a slight extent, while the lower rear margins proximate the trailing end 172 may curl slightly inwardly. In other words, the deflecting surfaces 165 may cooperate to form a somewhat funnel-shaped passage to taper down the stream of crop material 136 issuing from the conditioning arrangement 146 and impinging upon the first and second shields 166, 168.

In some embodiments, the first and second shields 166, 168 may be supported for rotation about a vertical axis (i.e., an axis substantially parallel to the vertical axis 118). The first and second shields 166, 168 may be moved to change the amount of convergence provided by the shields 166, 168. The shields 166, 168 may rotate between a first position and a second position to change the amount of tapering of the deflecting surfaces 165 along the longitudinal axis 114. The shields 166, 168 may cooperate to define a wider funnel-like shape in the second position as compared to the narrower first position. The shields 166, 168 may be moved in a coordinated manner such that the windrow is formed generally along a longitudinal axis of the windrower 100. In some embodiments, one of the shields 166, 168 may be shifted closer to the longitudinal axis than the other shield 166, 168 such that the windrow is formed to one side of the longitudinal axis. Other movements of the shields 166, 168 also fall within the scope of the present disclosure.

If the swath flap 162 of the first windrowing arrangement 156 is raised and the shields 166, 168 are disposed in the first position, the stream may bypass the swath flap 162 and may be acted upon by the shields 166, 168 to form the windrow 112 in accordance with the position of the shields 166, 168. On the other hand, if the swath flap 162 is lowered and the shields 166, 168 are in the second position, the stream may be intercepted by the swath flap 162 and directed down to the ground without engaging the shields 166, 168. In some embodiments, in the first position, the windrow 112 may be formed narrower and more densely with crop material 136, and in the second position, the windrow 112 may be formed wider and less densely. However, it will be appreciated that the width, shape, or other characteristic of the windrow 112 may be controlled in other ways.

As shown in FIG. 3, the windrower 100 may additionally include an actuator system. The actuator system 174 may include at least one actuator, such as an electric motor, a hydraulic actuator, or a pneumatic actuator of a known type. The actuator(s) may be configured for actuating the various implements discussed above. In some embodiments, at least one actuator may be a linear actuator with a first member and a second member that actuates linearly with respect to the first member. The first member may be fixed to the frame 122 and/or the chassis 106, and the second member may be fixed to the respective implement. Thus, the second member and the respective implement may actuate together with respect to the first member. Also, in some embodiments, linear actuation of the actuator may rotate the respective implement about its axis of rotation. In some embodiments, all or most of the actuators of the actuator system are linear actuators. Furthermore, actuators of the actuator system may include integrated sensors and may be interconnected to a control system via a CAN bus connection or otherwise. In some embodiments, a suitable switch may be provided in the operator compartment 108 of the tractor 102 for providing a user input for actuating the actuator. In additional embodiments, the actuators may be in communication with a controller that automatically actuates the actuator. Accordingly, the actuators may be reliable, highly programmable, and may provide accurate and controlled movement of the implement. Also, in some embodiments, the actuators may provide position feedback data that corresponds to the actual and current position of the implement as will be discussed in greater detail below.

As shown in FIG. 3, the actuator system may include at least one first actuator 201, which is operably coupled to the conditioning arrangement 146 and is configured for varying one or more parameters of the conditioning arrangement 146. In some embodiments, there may be a plurality of first actuators 201 for changing settings, variable parameters, etc. for the conditioning arrangement 146. The first actuators 201 may include a gap-adjustment actuator 208 and a bias-adjustment actuator 206. Additionally, in some embodiments, the first actuators 201 may include additional actuators configured for rotating the conditioner rollers 148, 150 about their respective axes of rotation 149, 151.

More specifically, there may be at least one gap-adjustment actuator 208 that is configured for changing the gap 152 between the first and second conditioner rollers 148, 150. In some embodiments, the gap-adjustment actuator 208 may be operably connected to the frame 122 and the second conditioner roller 150, and the gap-adjustment actuator 208 may be configured to move the second conditioner roller 150 relative to the frame and relative to the first conditioner roller 148. As such, the gap-adjustment actuator 208 may selectively vary the dimension of the roll gap 152 at the neutral position of the first and second conditioner rollers 148, 150. In additional embodiments, the gap-adjustment actuator 208 may move the first conditioner roller 148 instead of or in addition to the second conditioner roller 150 to vary the gap 152.

The bias-adjustment actuator 206 may be operably coupled to the biasing member 154, and may be configured for selectively varying the biasing force that the biasing member 154 provides (e.g., the biasing force provided to the second conditioner roller 150) at the neutral position. For example, the bias-adjustment actuator 206 may actuate to change the length of the biasing member 154 when the conditioning arrangement 146 is in the neutral position to thereby vary the biasing force provided by the biasing member 154. In cases of a hydraulic biasing member, the bias-adjustment actuator 206 may change a fluid pressure for changing the biasing force.

Furthermore, the actuator system may include at least one second actuator 210. The second actuator 210 may be operably coupled to the swath flap 162 for rotating the swath flap 162 about the axis 164. For example, the second actuator 210 may move the swath flap 162 between the raised position and the lowered position.

Additionally, the actuator system may include at least one third actuator 212. The third actuator 212 may be operably coupled to one or both forming shields 167. The third actuator 212 may be configured for moving the forming shields 167 between the first position and the second position. In some embodiments, each forming shield 167 may respectively include an independent third actuator 212 such that the forming shields 167 may articulate independent of each other relative to the frame 122 of the windrower 100.

Moreover, the actuator system may include at least one fourth actuator 202. The fourth actuator(s) 202 may be operably coupled to the cutting arrangement 140 for actuating the blades 142 in some embodiments. Also, in some embodiments, the fourth actuator(s) 202 may be operably coupled to the conveyor arrangement 144 for rotating the conveyor arrangement 144. In another implementation, at least one fifth actuator 204 may be operably coupled to the conveyor arrangement 144. That is the cutting arrangement 140 and the conveyor arrangement 144 are operably coupled to independent actuators 202 and 204, respectively. The at least one fifth actuator 204, may be configured to rotate the conveyor arrangement 144 and/or to position the conveyor arrangement 144.

In further embodiments, the fourth actuator(s) 202 may be operably coupled to the frame 122 for controlled lifting and lowering of the frame 122 relative to the chassis 106 of the tractor 102. The fourth actuator(s) 202 may also rotate the wheels 110 of the tractor 102 or actuate another component. In this regard, the fourth actuator(s) 202 may receive power from a power plant, such as a diesel engine, an electrical power source, a hydraulic pump, etc.

In some embodiments, the first, second, and third actuators 201, 210, and 212 may re-configure, shift, and re-position the second conditioner roller 150, the swath flap 162, and/or the forming shields 167 on-demand by the user using user controls in some embodiments. These components may be shifted between the first positions the second positions described herein. Also, these components may be shifted to various intermediate positions therebetween. Thus, the windrower 100 may be configured for windrowing/swathing quickly and easily while the windrower 100 is moving across a field and without the operator leaving the operator compartment 108.

The actuators 201, 210, and 212 may be stopped at any one of numerous positions by the operator without leaving the operator compartment 108. Accordingly, the amount of conditioning (i.e., the amount of crimp or compression) of the crop material 136 may be adjusted by moving the second conditioner roller 150 and changing the gap 152. Also, the amount of conditioning may be adjusted by changing the biasing force of the biasing member 154. Furthermore, the shape, arrangement, density, or other characteristic of the windrow 112 may be quickly and easily adjusted by moving the swath flap 162 and/or the forming shields 167. For example, the operator may choose to form a wider windrow 112 such that the crop material 136 dries more quickly. Similarly, if the freshly-cut crop material 136 is wetter than normal, the windrow 112 may be made wider for increased drying. Conversely, the windrow 112 may be made more narrow in consideration of subsequent processing that is to occur (e.g., chopping, raking, gathering, or other processing of the crop material 136 within the windrow 112). Also, the windrow 112 may be made more narrow and dense, for example, to avoid excessive sun bleaching of the crop material 136 within the windrow 112.

As shown in FIG. 3, the windrower 100 may additionally include a sensor system. The sensor system 184 may include one or more sensors that, for example, detect conditions related to the cutting arrangement 140, the conveying arrangement 144, the conditioning arrangement 146, the swath flap 162, and/or the forming shields 167. In some embodiments, the sensors may detect an actual (current) position or other setting (e.g. speed) of the cutting arrangement 140, the conveying arrangement 144, the conditioning arrangement 146, the swath flap 162, and/or the forming shields 167 as will be discussed. Other sensors may be included as well for detecting conditions related to the windrowing operations as discussed below.

The sensors of the sensor system may be of any suitable type. For example, sensors may include a potentiometer, a Hall Effect sensor, a proximity sensor, a microelectromechanical sensor (MEMS), a laser, an encoder, an infrared sensor, a camera, or other type. The sensors of the sensor system may be integrated sensors, which are combined or "integrated" with signal processing hardware in a compact device. The sensors of the system may also be operably connected to corresponding actuators of the actuator system for gathering data therefrom. In some embodiments, these sensors may detect a position or speed of an implement by detecting an electrical, magnetic, or other visual condition that is related to the position of the implement. Additionally, the sensor system may include one or more components that, for example, communicate with a global positioning system (GPS) that provides sensor input regarding the current position of one or more of the implements. The sensor input may be associated with stored data, such as maps, geo-coordinate markers, and so on, to reconcile the real-time machine and implement position in three-dimensional space with known objects and locations of a preset field.

Also, in some embodiments, the sensors may be incorporated within one of the actuators within the actuator system 174. Furthermore, while some sensors may be mounted to the windrower 100, other sensors of the sensor system may be remote from the windrower 100 as will be discussed.

As shown in FIG. 3, the sensor system may include at least one first sensor 203, which is operably coupled to the conditioning arrangement 146 and/or the first actuator(s) 201. The first sensors 203 may include a roller sensor 218 that is configured for detecting the position of the first and/or second roller 148, 150. The roller sensor 218 may also be configured for detecting the actual (current) dimension of the gap 152 between the first and second conditioner rollers 148, 150. The roller sensor 218 may also be configured for detecting the gap 152 as it changes over a predetermined time period. In other words, the roller sensor 218 may detect a dynamic position of the second conditioner roller 150 relative to the first conditioner roller 148. Furthermore, in some embodiments, the first sensors 203 may include a bias sensor 216 configured to detect the biasing load provided by the biasing member 154. Additionally, in some embodiments, the first sensors 203 may include a sensor that detects the angular speed or other related condition of the first and second conditioner rollers 148, 150.

The sensor system may further include at least one second sensor 220. The second sensor 220 may be operably coupled to the swath flap 162 in some embodiments. The second sensor 220 may detect the actual (current) position of the swath flap 162. For example, the second sensor 220 may detect the angle of the deflecting surface 161 relative to the frame 122 and/or relative to the ground.

Additionally, the sensor system may include at least one third sensor 222. The third sensor 222 may be operably coupled to one or more of the forming shields 167. The third sensor 222 may detect the position of the shields 167 with respect to each other, with respect to the frame 122, and/or with respect to the chassis 106.

Moreover, the sensor system may include at least one fourth sensor 212. In some embodiments, the fourth sensor 212 may be operably coupled to the cutting arrangement 140 for detecting the cutting speed of the blades 142. In additional embodiments, a fifth sensor 214 may be operably coupled to the conveyor arrangement 144 for detecting the angular speed of the conveyor arrangement 144. The fourth sensor 212 and/or the fifth sensor 214 may also be configured for detecting other conditions of the windrower 100 and/or tractor 102. For example, the fourth sensor 212 and/or the fifth sensor 214 may be configured as a speedometer that detects the ground speed of the tractor 102. The fourth sensor 212 and/or the fifth sensor 214 may also detect the current position of the frame 122 of the windrower 100 relative to the chassis 106 in some embodiments.

Figure 4:
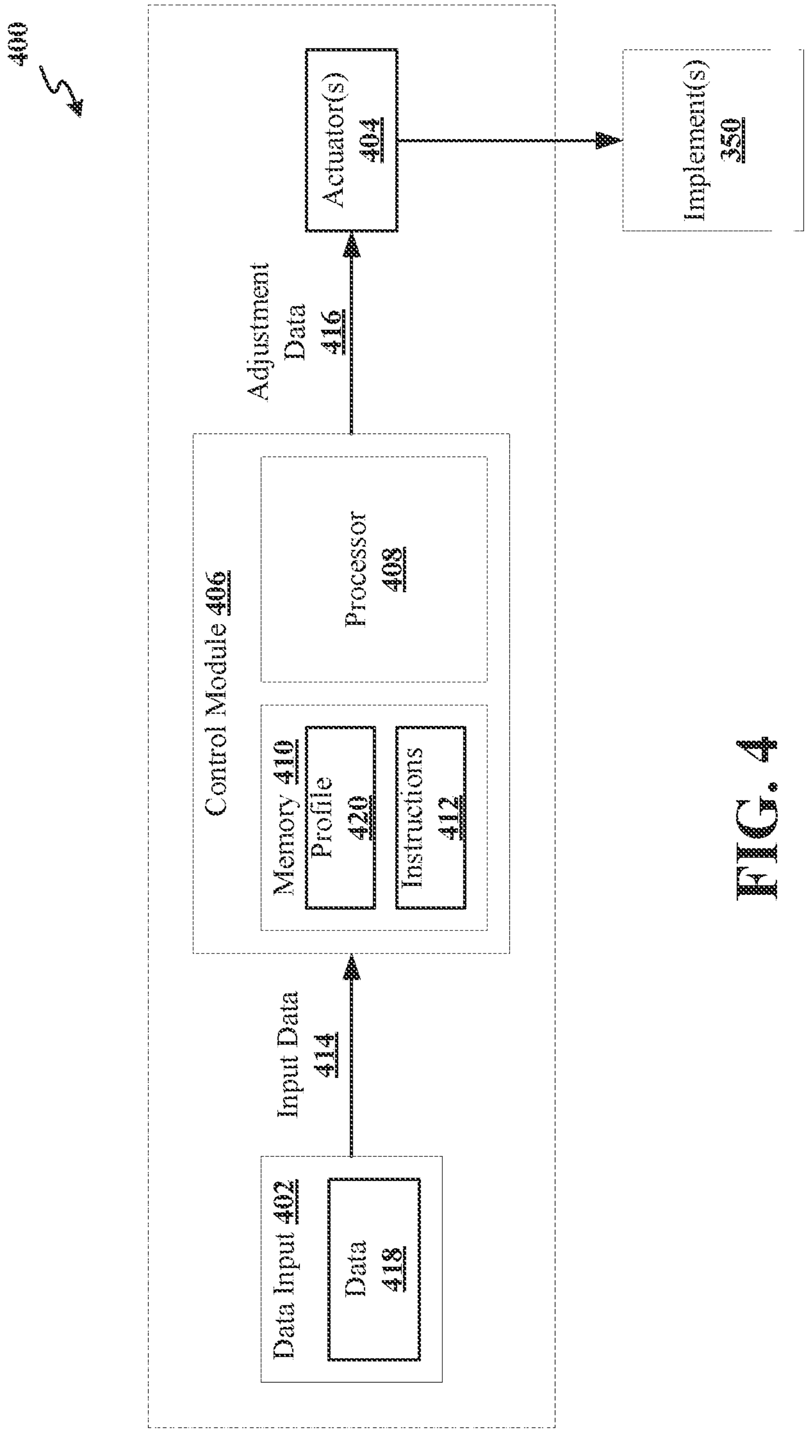
FIG. 4 illustrates a block diagram of an exemplary, non-limiting implementation of a system for the vehicle of FIGS. 1-3 according to one or more aspects.

FIG. 4 illustrates an exemplary, non-limiting implementation of a system 400 for a vehicle according to various aspects. In one example, system 400 may be implemented by the vehicle of FIGS. 1-3 (e.g. windrower 100). In the exemplary implementation shown in FIG. 4, the system 400 includes a data input component 402, such as a database, crop model, user interface, cloud-based data, etc., (e.g., disposed remotely or in vehicle). The data input component 402 may also comprise a sensor array comprising one or more sensors to detect various conditions of components of the vehicle, such as the sensors described above.

In FIG. 4, the input component 202 creates, includes, or receives data related to implements 350 such as cutting arrangement 140 or conveyor arrangement 144. As utilized herein, the cutting arrangement 140 may also be referred to as a cutter, cutter bar, or a header-particularly when discussing speed data. Further, the conveyor arrangement 144 may also be referred to a conveyor or an auger.

For example, according to an aspect, the data input component 402 collects the input data 414 indicative of auger slip. As noted above, an auger slip condition may be present when a ratio between a speed of a cutter bar and a speed of an auger deviate from a predetermined value. Therefore, the input data 414 can include a speed of the cutting bar (from sensor 212 for example) and a speed of the auger (from sensor 214, for example).

In FIG. 4, the example system 400 includes a control module 406 that is configured to receive the input data 414 and transmits adjustment data 416. That is, for example the control module 406 comprises a computer processor 408, that is configured to process data and instructions, and provide resulting data based on the processed data and instructions. Additionally, the control module 406 comprises memory 410 (e.g., computer memory, such as a device or system that is used to store information for use in a computer or related computer hardware and digital electronic devices, including short and long-term memory, temporary and permanent memory, and the like).

In this implementation, the memory 410 stores instructions 412 that are configured to, when processed by the computer processor 408, generate auger slip data indicative of an auger slip condition based on the input data 414 and generate adjustment data 416 indicative of an adjustment to one or more of implements 350 to mitigate the auger slip condition.

In the example system 400, one or more actuators 404 can be used to adjust one or more implements 350 of a vehicle to mitigate or resolve the auger slip condition. Actuators 404 can include any of actuators 202, 204, 206, 208, 210, and/or 212 described above with reference to FIG. 3. In addition, actuators 404 can include actuators associated with a vehicle drive system and configured to effect a change in a vehicle or engine speed.

According to some examples, the auger slip condition may be resolved by increasing the header speed (i.e., the cutter bar speed or speed of cutting arrangement 140). In some implementations where the cutter bar and the auger are coupled, this adjustment may also increase the auger speed. In another aspect, the engine speed may be increased. This may also increase the header speed by, for example, changing a setpoint. In yet another control scenario, a vehicle speed may be decreased. In addition, a roll gap may be increased and/or a forming shield and swatch flap may be controlled. Any of the foregoing machine controls may be employed to avoid and/or clear plugging of the windrower indicated by the auger slip condition.

In another aspect, further control scenarios may be available through separate and independent actuators for at least the cutter bar, the auger, and/or the conditioner as shown in FIG. 3. For example, an auger speed may be increased and/or a header speed may be decreased. In another aspect, conditioner speed may be independently controlled to improve conditioning of crop material. A drop distance of crop material may also be adjusted through control of the conditioner speed. In some instances, the conditioner speed may be adjusted together with another component to minimize crop loss. Still further, in the case of extreme slip conditions (i.e. plugging), the header and/or auger may be reversed.

Figure 5:
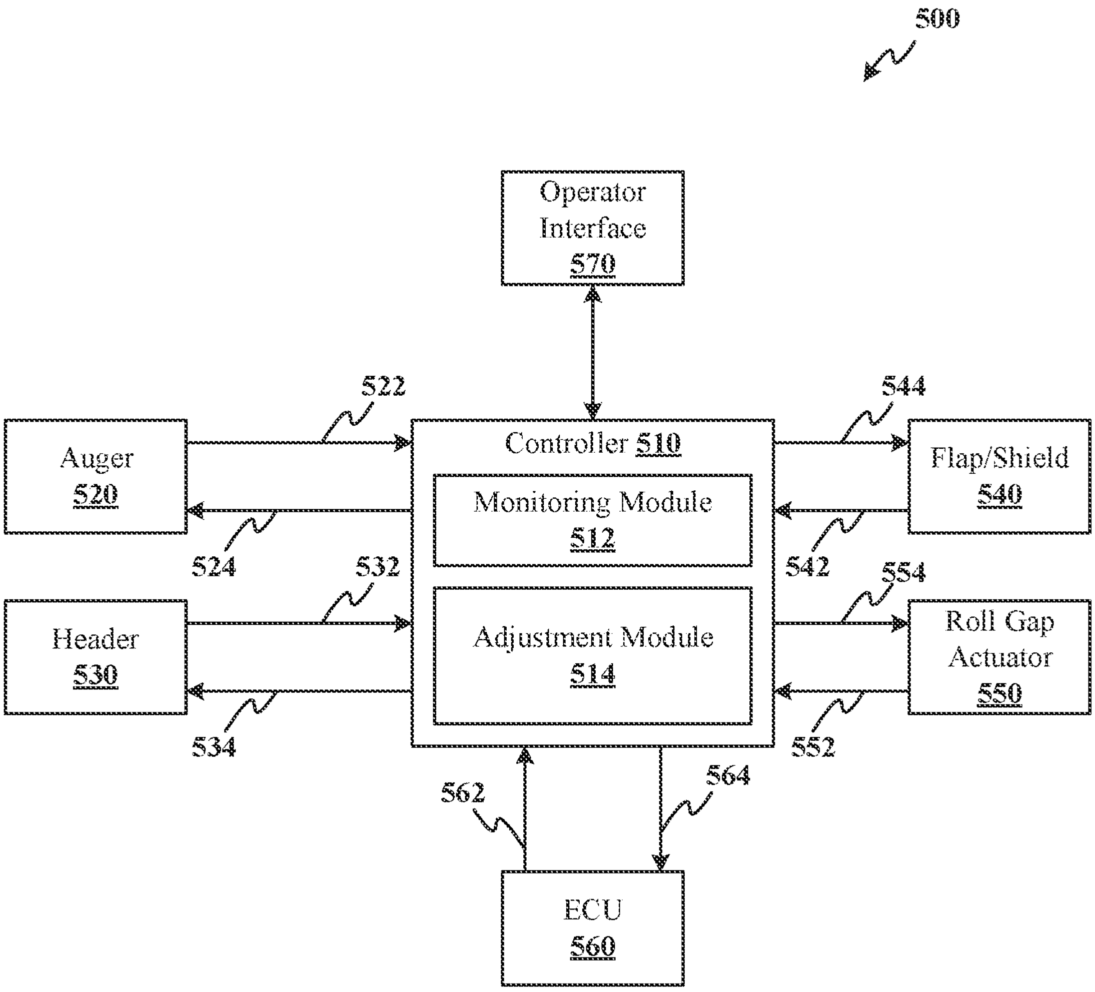
FIG. 5 illustrates a block diagram of an exemplary, non-limiting implementation of a control system according to various aspects.

Turning now to FIG. 5, illustrated is a schematic block diagram of a control system 500 according to various aspects. Control system 500 may be implemented by the work vehicle or windrower 100 described herein. As shown in FIG. 5, system 500 includes a controller 510 and some implements or components of vehicle 100 such as an auger 520, a header or cutter 530, a flap/shield 540, a roll gap actuator 550, an engine control unit 560, and an operator interface 570. Operator interface 570 may include various types of different operator interface mechanisms that generate outputs for an operator and allow an operator to provide inputs to control a machine. Controller 510 may include functional modules such as a monitoring module 512 and adjustment module 514. In an example, the functional modules may be implemented by computer-executable instructions that are executed by at least one computer processor of control system 510.

According to an example, monitoring module 512 can receive input such as an auger speed 522 and a header or cutter bar speed 532 from auger 520 and header 530, respectively. With these inputs, the monitoring module 512 determines and monitors a ratio between the cutter bar speed 532 and the auger speed 522. The monitoring module 512 may be configured with a predetermined value for the ratio, one or more threshold values, and one or more threshold durations. Monitoring module 512 determines when the ratio deviates from the predetermined value, by at least one of the one or more threshold values, for at least the threshold duration. Exemplary values for these thresholds and setpoints were provided above. Based on these parameters, the monitoring module 512 determines when an auger slip condition exists.

In response to the auger slip condition, the adjustment module 514 determines adjustment data and/or control signals to one or more implements or components of the vehicle. For instance, adjustment module 514 may generate controls signals or commands for actuators of implements or components. Such signals may include an auger control command or signal 524 to adjust a speed of auger 520, a header control command or signal 534 to adjust a position or speed of a cutter bar of header 530, an actuator control command or signal 544 to adjust a position or configuration of flap/shield 540, a roll gap actuator command or signal 554 to adjust a roll gap maintained by roll gap actuator 550, and/or a engine speed command 564 to ECU 560 to adjust an engine speed (and by extension a vehicle speed). Further, adjustment module 514 may provide output to operator interface 570 to inform an operator of adjustments to be made either automatically or manually.

In generating the adjustment data and/or control signals, the adjustment module 514 may receive inputs such as a position or status 542 of flap/shield 540, a position or status 552 of roll gap actuator 550, and/or a current engine speed 562 from ECU 560.

Figure 6:
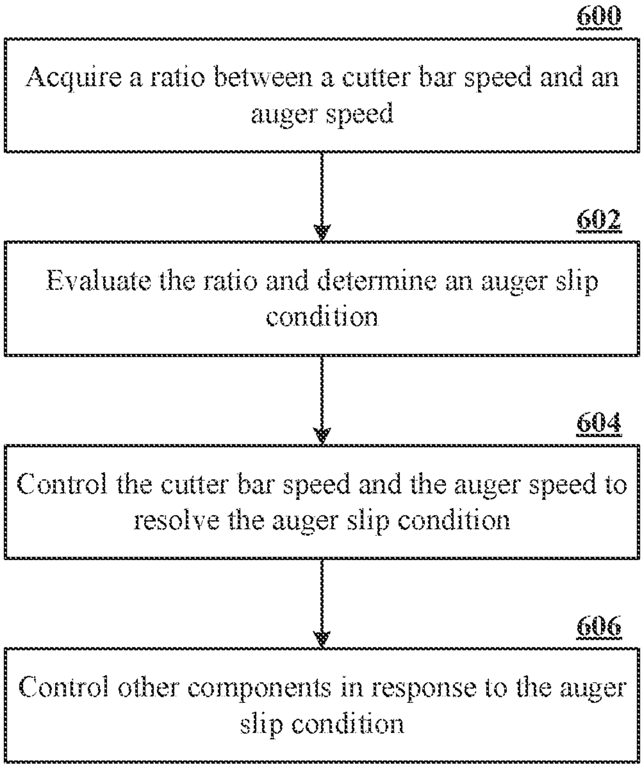
FIG. 6 is a flow chart of an exemplary, non-limiting implementation for controlling a vehicle according to various aspects.

Turning to FIG. 6, various features and operations of the systems described above are illustrated with an exemplary flowchart. The example in this figure are illustrative of some features of systems 400 and 500, and vehicle 100, but is not exhaustive. In FIG. 6, an exemplary, non-limiting implementation for controlling and mitigating plugging or an auger slip condition of a windrower is illustrated. The method can begin at 600 where a ratio between a cutter bar speed and an auger speed is acquired. The ratio may be acquired by sensors associated with the cutter bar and the auger that output sensor data indicative of the speed of the associated components. The sensor data is monitored and the ratio is derived therefrom.

At 602, the ratio is evaluated to determine an auger slip condition. For example, a predetermined value for the ratio, one or more threshold values, and one or more threshold durations may be configured. Based on these configured parameters, it can be determined when the ratio deviates from the predetermined value, by at least one of the one or more threshold values, for at least one of the threshold durations. For example, in some implementations, a header knife drive system may rotate roughly 2.65 times as fast as auger system. Plugging may be indicated by an auger slip condition, which may be shown by a change in the ratio for some duration (e.g. 5 seconds, etc.). For instance, in the example above, a moderate slip may be determined when a ratio is greater than or equal to 2.70 for more than 5 seconds or less than or equal to 2.60 for more than 5 seconds. Similarly, an extreme slip may be determined when the ratio is greater than or equal to 2.75 for more than 2 seconds or less than or equal to 2.55 for more than 2 seconds. These values are merely illustrative, may be vary based on a structure of the machine, and/or may be configurable for different environments. The above parameters are merely exemplary and are not limiting.

At 604, the cutter bar speed and/or the auger speed are controlled to resolve the auger slip condition. For example, the cutter bar speed may be decreased, and the auger speed may be increased. In the case of extreme slip, the speeds may be reversed. At 606, other components of the windrower may be controlled in response to the auger slip condition. For instance, a roll gap of a conditioner, a swath flap and/or a shield former may be adjusted in response to the auger slip condition. Still further, an engine speed and/or vehicle speed may be controlled.

Figure 7:
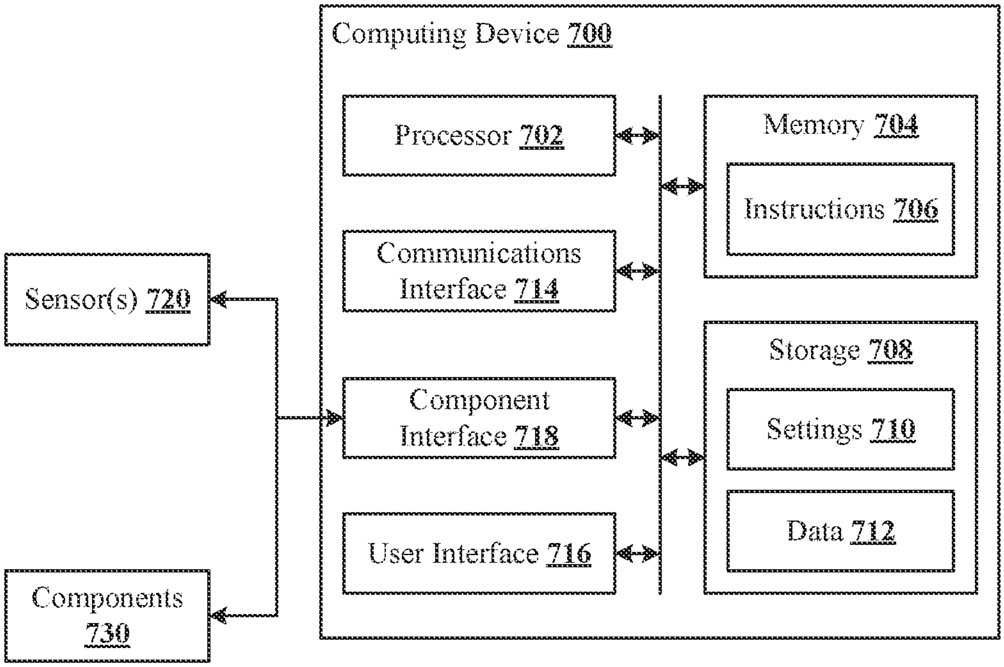
FIG. 7 is a schematic diagram of an exemplary, non-limiting implementation of a computing device according to various aspects.

Turning to FIG. 7, illustrated is a schematic block diagram of an exemplary, non-limiting implementation for a computing device 700. Computing device 700 may be utilized to implement system 100, controller 112, controller 122, controller 132, control system 410, or other controller of agricultural machines. Computing device 700 includes a processor 702 configured to execute computer-executable instructions 706 such as instructions composing a control system to detect and mitigate auger slip and/or plugging as described herein. Such computer-executable instructions 706 can be stored on one or more computer-readable media including non-transitory, computer-readable storage media such as memory 704. Memory 704 can also include other data (working data, sensor data, adjustment data, input data, or variables) or portions thereof during execution of instructions 706 by processor 702.

The computing device 700 can also include storage 708 that can be, according to an embodiment, non-volatile storage to persistently store instructions 706, settings 710 (e.g. configuration settings) and/or data 712 (e.g., operational data, sensor data, adjustment data, input data, machine inputs, etc.).

The computing device 700 may also include a user interface 716 that comprises various elements to obtain user input and to convey user output. For instance, user interface 716 can comprise of a touch display, which operates as both an input device and an output device. In addition, user interface 716 can also include various buttons, switches, keys, etc. by which a user can input information to computing device 700; and other displays, LED indicators, etc. by which other information can be output to the user. Further still, user interface 716 can include input devices such as keyboards, pointing devices, and standalone displays.

The computing device 700 further includes a communications interface 714 to couple computing device 700, via the communications network, to various devices such as, but not limited to, other computing devices 700, work vehicles, agricultural machines, sensors, drive systems, other controllers, servers, sensors, or Internet-enabled devices (e.g., IoT sensors or devices). Communication interface 714 can be a wired or wireless interface including, but not limited, a WiFi interface, an Ethernet interface, a Bluetooth interface, a fiber optic interface, a cellular radio interface, a satellite interface, etc.

A component interface 718 is also provided to couple computing device 700 to various components such as sensors 720, implements 730, and/or other components of work vehicles. Component interface 718 can include a plurality of electrical connections on a circuit board or internal bus of computing device 700 that is further coupled to processor 702, memory 704, etc. Component interface 718, in another embodiment, can be an interface for a CAN bus of work vehicle. Further, the component interface 718 can implement various wired or wireless interfaces such as, but not limited to, a USB interface, a serial interface, a WiFi interface, a short-range RF interface (Bluetooth), an infrared interface, a near-field communication (NFC) interface, etc.

According to an aspect, a system for adjusting an agricultural machine is provided. The system includes a controller that receives input data indicative of auger slip. The controller includes at least one processor and a memory that stores instructions. The instructions, when executed by the at least one processor, configure the at least one processor to: generate auger slip data indicative of an auger slip condition based on the input data; and generate adjustment data indicative of an adjustment to one or more components of the agricultural machine to mitigate the auger slip condition of the agricultural machine. The system also includes one or more actuators that adjust the one or more components of the agricultural machine based at least on the adjustment data.

In an example, the one or more components include one or more of a cutter, an auger, a conditioner, a forming shield, or a swath flap. In another example, the system includes at least two drive motors. A first drive motor couples to at least a first component and a second drive motor couples to at least a second component. In this example, the first component and the second component are respectively one of a header, an auger, or a conditioner roller, and the first component and the second component are different. Further, in another example, at least one of the first drive motor or the second drive motor couples to at least two components.

In yet another example, the input data includes at least a cutter bar speed and an auger speed and the auger slip data is a ratio between the cutter bar speed and the auger speed. In this example, the memory further stores instructions that configure the processor to determine the auger slip condition based on the auger slip data. The auger slip condition is determined when the ratio is outside a predetermined range for a predetermined amount of time.

In another example, the memory further stores instructions that configure the processor to generate adjustment data indicative of an adjustment to a ground speed of an agricultural machine. In this example, the system includes an electronic control unit that adjusts the ground speed of the agricultural machine based at least one the adjustment data.

In yet another example, the adjustment data indicates at least an increase in a speed of a header. In an example, the adjustment data indicates an increase in a roll gap. In another example, the adjustment data indicates an adjustment to a forming shield and swath flap. In yet another example, the adjustment data indicates an increase to an auger speed and a decrease to a header speed. In yet a further example, the adjustment data indicates a reversal of a header and an auger.

In another example, the system includes an operator interface. The memory further stores instructions that configure the processor to output an indication based on the adjustment data to the operator interface.

In another aspect, a method for controlling plugging of a windrower is provided. The method includes acquiring a ratio between a cutter bar speed and an auger speed. The method also includes evaluating the ratio to determine an auger slip condition. The method further includes, when the auger slip condition is determined, independently controlling the cutter bar speed and the auger speed through adjustment to respective actuators to mitigate the auger slip condition.

In an example, independently controlling the cutter bar speed and the auger speed includes increasing the auger speed and decreasing the cutter bar speed. In another example, the method also includes when the auger slip condition is determined, controlling at least one of a roll gap or a speed of a conditioner. In another example, controlling the cutter bar speed and the auger speed includes reversing the cutter bar and the auger. In yet another example, the method includes when the auger slip condition is determined, opening a forming shield of the windrower.

According to yet another aspect, a system for a windrower is provided. The system includes a set of sensors configured to sense at least a speed of a cutter bar and a speed of an auger. The system also includes a header with a header actuator. The system also includes the auger with an auger actuator. In addition, the system includes a controller. The controller is configured to receive sensor data from the set of sensors. The controller is further configured to determine an auger slip condition based the speed of the cutter bar and the speed of the auger. In addition, the controller is configured to generate adjustment data indicative of an adjustment to at least one of the header or the auger. The controller is also configured to generate one or more control signals based on the adjustment data. The controller is also configured to communicate the one or more control signals to at least one of the header actuator or the auger actuator. In addition, the header actuator and the auger actuator are decoupled and independently controllable by the controller.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as “top,” “bottom,” “horizontal,” “vertical,” “longitudinal,” “lateral,” and “end” are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as “circular” or “cylindrical” or “semi-circular” or “semi-cylindrical” or any related or similar terms, are not required to conform strictly to the mathematical definitions of circles or cylinders or other structures, but can encompass structures that are reasonably close approximations.

Conditional language used herein, such as, among others, “can,” “might,” “may,” “e.g.,” and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase “at least one of X, Y, and Z,” unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms “approximately,” “about,” and “substantially” as used herein represent an amount close to the stated amount that still performs a desired function or achieves a desired result. For example, in some embodiments, as the context may dictate, the terms “approximately”, “about”, and “substantially” may refer to an amount that is within less than or equal to 10% of the stated amount. The term “generally” as used herein represents a value, amount, or characteristic that predominantly includes or tends toward a particular value, amount, or characteristic. As an example, in certain embodiments, as the context may dictate, the term “generally parallel” can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for controlling work vehicle to mitigate plugging have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for vehicle or implement control to mitigate plugging. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication.

The ranges disclosed herein also encompass any and all overlap, subranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for multiplex air cart have been disclosed. Although the systems and methods for multiplex air cart have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

The invention claimed is:

1. A system for adjusting an agricultural machine, comprising:

a controller that receives input data indicative of auger slip, wherein the controller includes:

at least one processor; and a memory that stores instructions that, when executed by the at least one processor, configure the at least one processor to:

generate auger slip data indicative of an auger slip condition based on the input data, wherein the auger slip data is a ratio between the cutter bar speed and the auger speed; and generate adjustment data indicative of an adjustment to one or more components of the agricultural machine to mitigate the auger slip condition of the agricultural machine; and one or more actuators that adjust the one or more components of the agricultural machine based at least on the adjustment data.

2. The system of claim 1, wherein the one or more components include one or more of a cutter, an auger, a conditioner, a forming shield, or a swath flap.

3. The system of claim 1, further comprising at least two drive motors, wherein a first drive motor couples to at least a first component and a second drive motor couples to at least a second component.

4. The system of claim 3, wherein the first component and the second component are respectively one of a header, an auger, or a conditioner roller, and the first component and the second component are different.

5. The system of claim 3, wherein at least one of the first drive motor or the second drive motor couples to at least two components.

6. The system of claim 1, wherein the input data includes at least the cutter bar speed and the auger speed.

7. The system of claim 6, wherein the memory further stores instructions that configure the processor to determine the auger slip condition based on the auger slip data, wherein the auger slip condition is determined when the ratio is outside a predetermined range for a predetermined amount of time.

8. The system of claim 1, wherein the memory further stores instructions that configure the processor to generate adjustment data indicative of an adjustment to a ground speed of an agricultural machine, and wherein the system further includes an electronic control unit that adjusts the ground speed of the agricultural machine based at least in part on the adjustment data.

9. The system of claim 1, wherein the adjustment data indicates at least an increase in a speed of a header.

10. The system of claim 1, wherein the adjustment data indicates an increase in a roll gap.

11. The system of claim 1, wherein the adjustment data indicates an adjustment to a forming shield and swath flap.

12. The system of claim 1, wherein the adjustment data indicates an increase to an auger speed and a decrease to a header speed.

13. The system of claim 1, wherein the adjustment data indicates a reversal of a header and an auger.

14. The system of claim 1, further comprising an operator interface, wherein the memory further stores instructions that configure the processor to output an indication based on the adjustment data to the operator interface.

15. A method for controlling plugging of a windrower, comprising:

acquiring a ratio between a cutter bar speed and an auger speed;

evaluating the ratio to determine an auger slip condition; and when the auger slip condition is determined:

independently controlling the cutter bar speed and the auger speed through adjustment to respective actuators to mitigate the auger slip condition.

16. The method of claim 15, wherein independently controlling the cutter bar speed and the auger speed includes increasing the auger speed and decreasing the cutter bar speed.

17. The method of claim 15, further comprising, when the auger slip condition is determined, controlling at least one of a roll gap or a speed of a conditioner.

18. The method of claim 15, wherein controlling the cutter bar speed and the auger speed includes reversing the cutter bar and the auger.

19. The method of claim 15, further comprising, when the auger slip condition is determined, opening a forming shield of the windrower.

20. A system for a windrower, comprising:

a set of sensors configured to sense at least a speed of a cutter bar and a speed of an auger;

a header with a header actuator;

the auger with an auger actuator; and a controller configured to:

receive sensor data from the set of sensors;

determine an auger slip condition based the speed of the cutter bar and the speed of the auger;

generate adjustment data indicative of an adjustment to at least one of the header or the auger;

generate one or more control signals based on the adjustment data; and communicate the one or more control signals to at least one of the header actuator or the auger actuator, wherein the header actuator and the auger actuator are decoupled and independently controllable by the controller.

* * * * *